US009762463B2

(12) United States Patent
Horsley

(10) Patent No.: US 9,762,463 B2
(45) Date of Patent: Sep. 12, 2017

(54) METHODS AND APPARATUS FOR OPERATING AN ACCESS NETWORK

(71) Applicant: BRITISH TELECOMMUNICATIONS PUBLIC LIMITED COMPANY, London (GB)

(72) Inventor: Ian Edwin Horsley, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/113,217

(22) PCT Filed: Jan. 14, 2015

(86) PCT No.: PCT/GB2015/050062
§ 371 (c)(1),
(2) Date: Jul. 21, 2016

(87) PCT Pub. No.: WO2015/110792
PCT Pub. Date: Jul. 30, 2015

(65) Prior Publication Data
US 2017/0026257 A1    Jan. 26, 2017

(30) Foreign Application Priority Data
Jan. 23, 2014   (EP) .................................. 14250009

(51) Int. Cl.
*G06F 15/173*       (2006.01)
*H04L 12/26*        (2006.01)
(Continued)

(52) U.S. Cl.
CPC ........ *H04L 43/067* (2013.01); *H04L 12/2863* (2013.01); *H04L 41/24* (2013.01);
(Continued)

(58) Field of Classification Search
USPC ........................................ 709/224, 227, 200
See application file for complete search history.

(56) References Cited

U.S. PATENT DOCUMENTS 7,757,013 B1 * 7/2010 Lawson .............. G06F 11/3409
710/15
8,401,899 B1 * 3/2013 Kauchak ............ G06Q 30/0254
705/14.42
(Continued)

FOREIGN PATENT DOCUMENTS

| WO | WO 2008/093045 | 8/2008 |
| WO | WO 2009/081131 | 7/2009 |
| WO | WO 2012/042231 | 4/2012 |

OTHER PUBLICATIONS

International Search Report and Written Opinion of the ISA for PCT/GB2015/050062, dated Apr. 15, 2015, 9 pages.
(Continued)

*Primary Examiner* — El Hadji Sall
(74) *Attorney, Agent, or Firm* — Nixon & Vanderhye P.C.

(57) ABSTRACT

Methods and apparatus are disclosed for operating an access network including data connections (19) between end-user devices (12, 14, 16, 18) and an aggregation transceiver (20) at which connections (19) are aggregated for onward connection through the network. The method comprises, for each connection, obtaining connection data for each of a plurality of monitoring periods, each comprising shorter periods, the connection data comprising performance and user activity indications for each shorter period; monitoring the performance of the connection in order to estimate a measure of its performance during a particular monitoring period that discounts performance indications obtained in respect of shorter periods within that monitoring period when the user was inactive unless activity indications in respect of corresponding shorter periods within other moni-
(Continued)

toring periods indicate that such user inactivity is anomalous; and applying a profile to the connection that is dependent on the measure of performance of the data connection.

16 Claims, 5 Drawing Sheets

(51) Int. Cl.
    *H04M 3/22*     (2006.01)
    *H04M 3/30*     (2006.01)
    *H04M 11/06*     (2006.01)
    *H04Q 9/00*     (2006.01)
    *H04L 12/28*     (2006.01)
    *H04L 12/24*     (2006.01)
    *H04L 29/08*     (2006.01)

(52) U.S. Cl.
    CPC .......... *H04L 43/0888* (2013.01); *H04L 43/14* (2013.01); *H04L 43/16* (2013.01); *H04L 43/50* (2013.01); *H04L 67/22* (2013.01); *H04M 3/2227* (2013.01); *H04M 3/304* (2013.01); *H04M 11/062* (2013.01); *H04Q 9/00* (2013.01); *H04M 2201/18* (2013.01); *H04Q 2209/823* (2013.01); *Y02B 60/33* (2013.01); *Y02B 60/36* (2013.01)

(56) References Cited

U.S. PATENT DOCUMENTS

| | | |
|---|---|---|
| 8,958,308 B2 | 2/2015 | Cook et al. |
| 2005/0088976 A1* | 4/2005 | Chafle ................ H04L 12/5695 370/252 |
| 2011/0054846 A1* | 3/2011 | Karayi ................ G06F 1/3203 702/186 |
| 2013/0201836 A1 | 8/2013 | Cook et al. |

OTHER PUBLICATIONS

Search Report for EP 14250009.9, dated Jul. 7, 2014, 4 pages.
"Dynamic Line Management for Digital Subscriber Lines", Maximizing Data Rates, Maintenance Quality and Stability, Alcatel Technology White Paper, Apr. 2005, 10 pages.
S. Ooghe et al., Framework and Requirements for an Access Node Control Mechanism in Broadband Multi-Service Networks, Internet Engineering Task Force (IETF), May 2010, 47 pages.

* cited by examiner

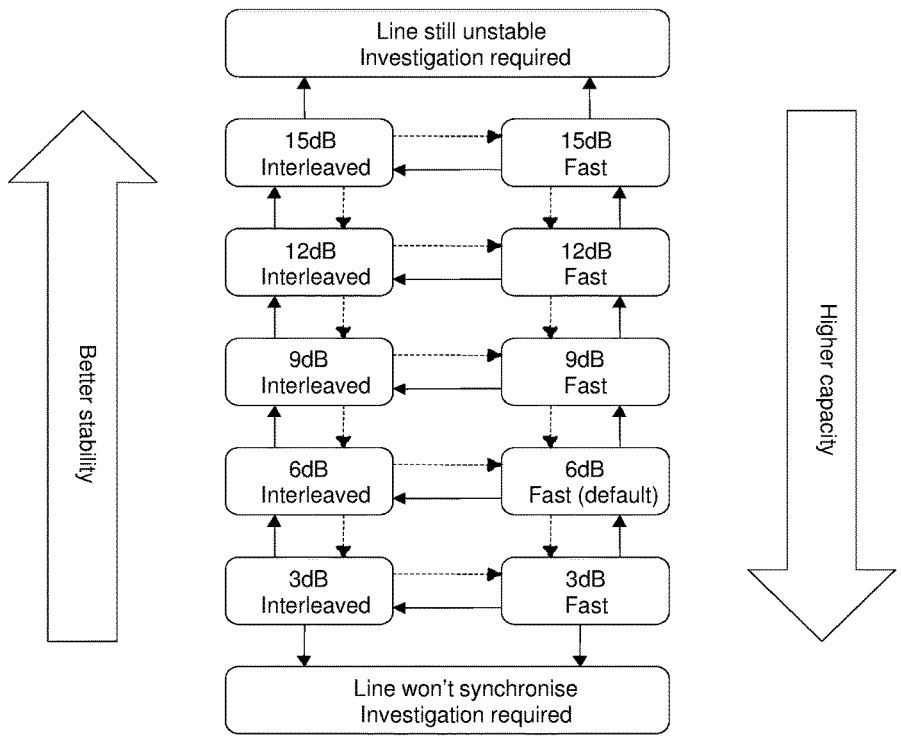
Figure 5: Table 1
| Stability | Metric | Very Poor | Poor | OK | Good |
|---|---|---|---|---|---|
| Aggressive | Re-Trains | >10 per hour | mtb<3600 | mtb<8640 | mtb≥8640 |
| Aggressive | Errors | ~ | mtb<10 | mtb<8640 | mtb≥8640 |
| Normal | Re-Trains | >10 per hour | mtb<7200 | mtb<8640 | mtb≥8640 |
| Normal | Errors | ~ | mtb<300 | mtb<8640 | mtb≥8640 |
| Stable | Re-Trains | >10 per hour | mtb<28800 | mtb<86400 | mtb≥86400 |
| Stable | Errors | ~ | mtb<1000 | mtb<28800 | mtb≥28800 |
Figure 6: Table 2

METHODS AND APPARATUS FOR OPERATING AN ACCESS NETWORK

This application is the U.S. national phase of International Application No. PCT/GB2015/050062 filed 14 Jan. 2015, which designated the U.S. and claims priority to EP Patent Application No. 14250009.9 filed 23 Jan. 2014, the entire contents of each of which are hereby incorporated by reference.

TECHNICAL FIELD

The present invention relates to methods and apparatus for operating an access network. In particular it relates to methods and apparatus for operating an access network including a plurality of data connections between end-user devices and an aggregation transceiver device in accordance with techniques generally referred to as Dynamic Line Management.

BACKGROUND TO THE INVENTION AND PRIOR ART

Dynamic Line Management (DLM) is a technique for improving the performance (in terms of stability, speed, latency or otherwise) of DSL connections. (NB The term "xDSL" is sometimes used to refer to any of an increasing family of DSL technologies, but the term "DSL" will in general be used here). DLM is particularly useful when operating DSL connections at close to their maximum speed, because under these conditions external noise affecting the transmitted signal can cause the transceivers to be unable to successfully recover the signal transmitted with sufficient reliability to enable the connection to be maintained. If this occurs, the connection needs to be re-established. This is referred to as a re-synchronisation ("re-synch") or a re-train, and the user generally notices a temporary loss of service while the connection is re-established, which may take 30 seconds or more. Re-synchs are generally found to be particularly annoying by end-users using VoIP or video services, but are generally less noticeable to users simply browsing the web.

DLM seeks to minimise re-synchs by automatically analysing DSL connections (especially the rate of occurrence of re-synchs) and varying certain parameters which can affect the likelihood of re-synchs occurring (for example the depth of interleaving, the amount of redundancy built into the encoding used, etc.). Typically, this is done by using a number of different "profiles" having various different sets of values for the parameters most likely to have an impact on the performance (stability or otherwise) of DSL connections and moving a particular connection between different profiles until a profile is found which provides acceptable performance. The profiles are applied at the network equipment end of the access loop, usually within a piece of equipment known as a Digital Subscriber Line Access Multiplexer (DSLAM) which houses a number of DSL transceiver units as is well known in the art. This may be done at a local exchange (sometimes referred to—especially in the USA—as the Central Office), but may be done closer to the user premises (at a street-cabinet, for example, in "Next-Generation Access (NGA), for example).

Typically, the profiles can conceptually be thought of as ranging between "more aggressive" and "less aggressive", where the more aggressive profiles tend to provide better services to the user in terms of especially higher bit-rates and lower latencies, but are more likely to result in the line being unstable, whereas less aggressive profiles tend to offer lower bit rates and/or higher latencies but greater stability.

Profiles need not be "predetermined"—in some cases, they may be generated or created from scratch or by modifying an existing profile in response to a determination that different operational parameters are likely to lead to better performance, for example.

Referring to prior disclosures, an Alcatel Technology White Paper from April 2005 entitled "Dynamic Line Management for Digital Subscriber Lines" previously available at: http://www1.alcatel-lucent.com/com/en/appcontent/apl/18812_DLM_twp_tcm172-228691635.pdf discusses DLM and suggests in overview an implementation in which there is a "Validation" phase and an "Operations" phase. In the Validation phase a connection is monitored fairly intensively to identify an appropriate profile for the line and thereafter it is monitored less intensively to ensure that the originally selected profile continues to remain valid.

International patent application WO2008/093045 describes an earlier DLM solution devised by the present applicants in which very unstable data connections are detected in an efficient manner and corrective action is taken within a relatively short period of time whilst data connections which are not very unstable are monitored and transitioned between different profiles based on more thorough monitoring over a longer time-scale.

DLM solutions such as those above use, as at least one of the metrics used in monitoring the performance of a line, the number of re-trains or re-synchs occurring on a line within a predetermined period of time. In view of the fact that this metric can in certain circumstances be misleading, International patent application WO2009/081131 proposed a technique intended to allow for a more reliable metric of line performance to be provided. The technique disclosed involves processing data on the number of re-trains or re-synchs occurring on a line within a predetermined period of time in order to take account of the possibility that some re-synchs may be caused (i.e. intentionally) by user action rather than as a result of the line experiencing technical problems or instability.

International patent application WO2012/042231 relates to a method of operating an access network in which a different profile from a plurality of stored profiles is selected and applied to a data connection between an end-user device and an aggregation transceiver device. The selection of a profile is done in dependence on an analysis of connection data relating to a monitoring period which itself comprises a plurality of shorter periods. The analysis is done in such a way as to discount indications of instability that have been obtained in respect of any shorter periods during which it is determined that the user was actually inactive.

SUMMARY OF THE INVENTION

According to a first aspect, there is provided a method of operating an access network including a plurality of data connections between end-user devices and an aggregation transceiver device at which the data connections are aggregated for onward connection through the access network, the method comprising, for each data connection:

obtaining connection data in respect of each of a plurality of monitoring periods, each monitoring period comprising a plurality of shorter periods, the connection data in respect of a particular monitoring period comprising, for each of the shorter periods of said particular monitoring period, a performance indication indicative of whether or not the performance of the data connection has been above or below a predetermined performance threshold during said shorter period, and a user activity indication indicative of a measure of user activity on said data connection during said shorter period;

monitoring the performance of the data connection in dependence on said connection data, the monitoring may including identifying, from the shorter periods within a particular monitoring period, those shorter periods in respect of which the user activity indication is indicative of user activity above a predetermined level having been observed on said data connection during said shorter period, and estimating, from performance indications obtained in respect of those shorter periods so-identified, a measure of the performance of the data connection during said particular monitoring period; and applying a profile to the data connection, the profile specifying a set of values for one or more parameters associated with said data connection and being dependent on the measure of the performance of the data connection;

wherein estimating the measure of the performance of the data connection during said particular monitoring period comprises discounting performance indications obtained in respect of shorter periods within said particular monitoring period in respect of which the user activity indications are indicative of user activity above said predetermined level not having been observed unless one or more user activity indications obtained in respect of one or more corresponding shorter periods within one or more other monitoring periods indicate that user activity above said predetermined level has been observed during the corresponding shorter periods within the one or more other monitoring periods.

According to preferred embodiments, the performance indications for a data connection may be stably indications indicative of whether or not the data connection has experienced instability during the respective shorter periods. They may, for example, be indications indicative of whether or not the data connection has re-synchronised during the respective shorter periods and/or indicative of the number of times the data connection has re-synchronised during the respective shorter periods. Alternatively or additionally, the performance indications for a data connection may, for example, be indications indicative of whether or not errors have occurred in data traversing the data connection during the respective shorter periods and/or indicative of the number of errors that have occurred in data traversing said the connection during the respective shorter periods.

According to preferred embodiments, the connection data for a data connection may comprise performance indications relating to a plurality of different characteristics. Whether the performance indications relate to a plurality of different characteristics or just one, possible characteristics include stability, line-rate, latency and signal-to-noise ratio.

In embodiments where the connection data comprises performance indications relating to a plurality of different characteristics, estimating the measure of the performance of a data connection during a particular monitoring period may comprise discounting performance indications relating to one or more of the plurality of different characteristics obtained in respect of shorter periods within the particular monitoring period in respect of which the user activity indications are indicative of user activity above the predetermined level not having been observed unless one or more user activity indications in respect of one or more corresponding shorter periods within one or more other monitoring periods indicate that user activity above the predetermined level has been observed during the corresponding shorter periods within the one or more other monitoring periods.

According to preferred embodiments, the user activity indications in respect of a particular data connection may comprise indications indicative of one or more of:

(i) a measure of the amount of user data flowing on the data connection from one or more end-user devices during the respective shorter periods;

(ii) a measure of the amount of user data flowing on the data connection towards one or more end-user devices during the respective shorter periods;

(iii) a measure of the combined amount of user data flowing on the data connection either to or from one or more end-user devices during the respective shorter periods.

(iv) a measure of the amount of a particular type of user data flowing on the data connection from one or more end-user devices during the respective shorter periods;

(v) a measure of the amount of a particular type of user data flowing on the data connection towards one or more end-user devices during the respective shorter periods;

(vi) a measure of the combined amount of a particular type of user data flowing on the data connection to and from one or more end-user devices during the respective shorter periods.

In cases such as (iv), (v) and (vi), the types of data may be categorised with respect to service type, data priority, data rate, or in any of a variety of other ways.

The user activity indications in respect of a particular data connection may comprise power-mode indications indicative of whether or not the data connection in question was in a low-power mode or not during the respective shorter periods. Power-mode indications indicating that the data connection in question was in a low-power mode during the respective shorter periods may be taken as user activity indications indicative of user activity not having been observed above the predetermined level.

According to preferred embodiments, the length of a monitoring period is of the order of (or exactly) 24 hours, since a one-day period is likely to be suitable for identifying patterns of use by users of their data connections. The length of a monitoring period may however be of the order of one hour, one week, one month, one year, or longer, allowing hourly, weekly, monthly, annual, or other patterns of use to be identified as well as or instead of daily patterns of use.

According to preferred embodiments, estimating the measure of the performance of the data connection during the particular monitoring period may comprise an analysis of user activity during corresponding shorter periods within a plurality of other monitoring periods. This may provide a particularly good indication of whether a pattern of user activity or inactivity during a particular monitoring period is normal or anomalous.

According to preferred embodiments, estimating the measure of the performance of the data connection during the particular monitoring period may involve an analysis of user activity during corresponding shorter periods within one or more other monitoring periods corresponding to said particular monitoring period. Other monitoring periods may be deemed to be "corresponding monitoring periods" in dependence on one or more of the following:

(i) whether the particular monitoring period and the other monitoring periods relate to the same day of the week;

(ii) whether the particular monitoring period and the other monitoring periods relate to weekdays or weekend days (when patterns of use are likely to be different for many users);
(iii) whether the particular monitoring period and the other monitoring periods relate to public holiday days;
(iv) a user-specific or provider-specific definition specifying which other monitoring period or periods should be deemed to correspond to the particular monitoring period for the data connection in question.

Shorter periods within different monitoring periods may be deemed to be "corresponding shorter periods" if they relate to periods of time at corresponding stages within different monitoring periods and/or to periods of time next to periods of time at corresponding stages in different monitoring periods. For example, if the monitoring period is 24 hours and the shorter periods are 15-minute periods, then 15-minute periods at the same time each day may be deemed to be "corresponding shorter periods".

The step of applying a profile to the data connection may comprise applying a selected one of a plurality of stored profiles to the data connection, with the selection of the (previously created) profile being dependent on the measure of the performance of the data connection. Alternatively or additionally, the step of applying a profile to the data connection may comprise applying a profile generated to specify a set of values for the one or more parameters, with one or more of the values being dependent on the measure of the performance of the data connection, essentially generating and applying a new profile.

According to a second aspect, there is provided a management device for use in an access network comprising a plurality of data connections between end-user devices and an aggregation transceiver device at which the data connections are aggregated for onward connection through the access network, the device being operable to perform a method according to the first aspect in respect of each of a plurality of data connections.

According to a third aspect, there is provided an access network including a management device according to the second aspect.

According to a fourth aspect, there is provided tangible carrier means carrying a computer program or suite of computer programs for causing the method according to the first aspect to be carried out during execution of the program or programs.

The various options and preferred embodiments referred to above in relation to the first aspect are also applicable in relation to the second, third and fourth aspects.

BRIEF DESCRIPTION OF THE DRAWINGS

In order that the present invention may be better understood, embodiments thereof will now be described, by way of example only, with reference to the accompanying drawings in which:

FIG. 5 shows Table 1 as referred to in the description, which shows the basic flow of an exemplary DLM process; and FIG. 6 shows Table 2 as referred to in the description, which shows thresholds for categorising lines.

Figure 1:
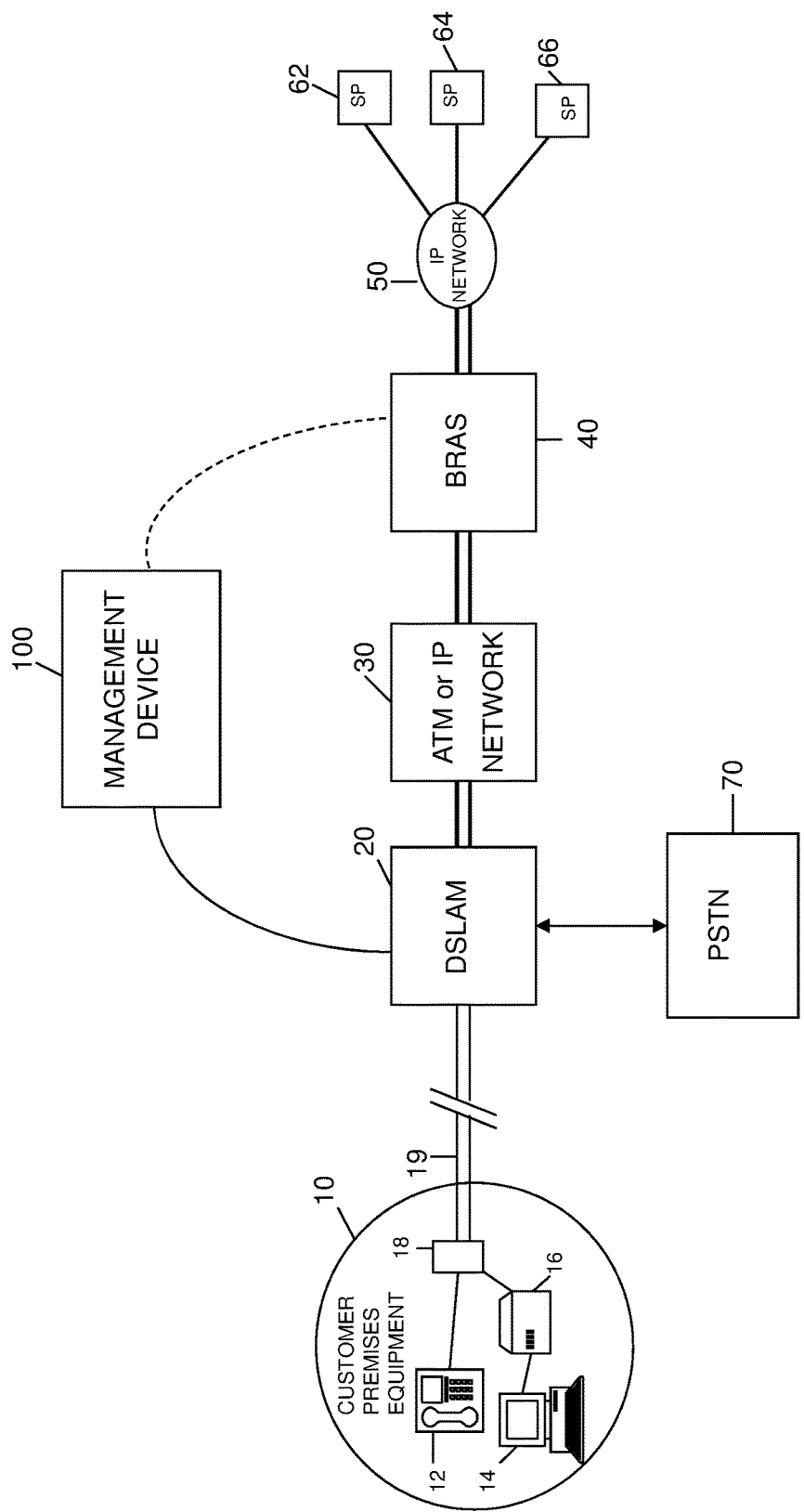
FIG. 1 is a schematic block diagram illustrating a telecommunications network incorporating a management device operating in accordance with a method according to an embodiment of the invention.

DESCRIPTION OF PREFERRED
EMBODIMENTS OF THE INVENTION

With reference to the accompanying figures, methods and apparatus for operating an access network according to preferred embodiments will be described.

The main embodiment described below uses a management device 100 to perform a Dynamic Line Management (DLM) function using, in particular, indications of line instability as indications of poor, below-threshold, or otherwise sub-optimal performance. As will become apparent, other types of indications may be used as indications of the performance level of the line instead of or as well as instability (or stability) indications, such as indications of line-rate, latency, signal-to-noise ratio or other line characteristics. For simplicity, however, the description below will relate primarily to embodiments where instability indications serve as the performance indications.

In some embodiments, the same management device may (optionally) also perform a function called Broadband Remote Access Server (BRAS) provisioning, so this option will be described briefly, but it will be noted that this need not be performed by the management device. A corresponding function may, for example, be performed in accordance with the Access Node Control Protocol (ANCP) (IETF RFC 5851), by which an Access Node (AN) such as a DSLAM can communicate with a Network Access Server (NAS) such as a BRAS. In such cases, the management device need not interact with the BRAS, as implied by the dotted line between the two items in FIG. 1.

As for the DLM function, this is desirable in the main embodiment because the downstream speed of the DSL connections controlled by the management device generally rate-adapts to the highest speed the line can support (e.g. from 2 Mb to 100 Mb or more for VDSL2). As the DSL connections are running at their maximum limits, they may be more susceptible to noise which can cause errors and spontaneous resynchronisations (re-synchs).

In overview, with the present embodiment, the role of the DLM function of the management device is to ensure that the DSL connections provide a good compromise between the stability of the line and the performance of the line in terms of bit-rate (or perhaps more importantly the rate at which a user can receive desired data—after any lost packets caused by errors have been re-sent, for example) and latency. The DLM function does this by receiving data from DSLAM Data Collectors each day and processing this received data. The DLM function is then able to increase or decrease the noise margins or bit-rate caps and/or interleave levels as required by setting a new profile for each DSL connection (using the existing provisioning systems for setting profiles at DSLAMs). This basic functionality may be enhanced with logic to minimise churn or oscillation of profiles (by attempting to stabilise the DSLAM profile for each connection, rather than reacting to every relevant change in the environment of the connection which could cause the maximum stable profile applicable to change).

Main Embodiment

Referring to FIG. 1, an embodiment of the invention is illustrated in overview. A copper pair loop 19 (which forms part of the access network extending between customer premises equipment 10 and the BRAS 40) connects customer premises equipment 10 to a DSLAM 20 located within a local exchange (known as a central office in the US), or alternatively in a local cabinet or at a drop-point, for example. The DSLAM separates normal voice traffic and data traffic and sends the voice traffic to the Public Switched Telephone Network (PSTN) 70, unless an IP voice solution is used in which case the voice is carried over the data channel.

The above-mentioned arrangement of items 10, 19, 20, 30, 40, 50, 62, 64, 66 and 70 is conventional, but embodiments of the invention may be used with other arrangements. In addition to this conventional arrangement, in the present embodiment there is a management device 100 which communicates with both the DSLAM 20 and the BRAS 40. The detailed operation of this device (especially as regards its DLM function) is explained in greater detail below with reference to FIGS. 2 and 3. However, in overview it obtains information from the DSLAM 20 about the rate at which each Digital Subscriber Line (DSL) connects to the DSLAM and information about events such as detected errors and/or re-synchs occurring on the line/connection and modifies operation of the DSLAMs as regards the aggressiveness of the profile used by a respective DSLAM for a respective DSL connection.

Figure 2:
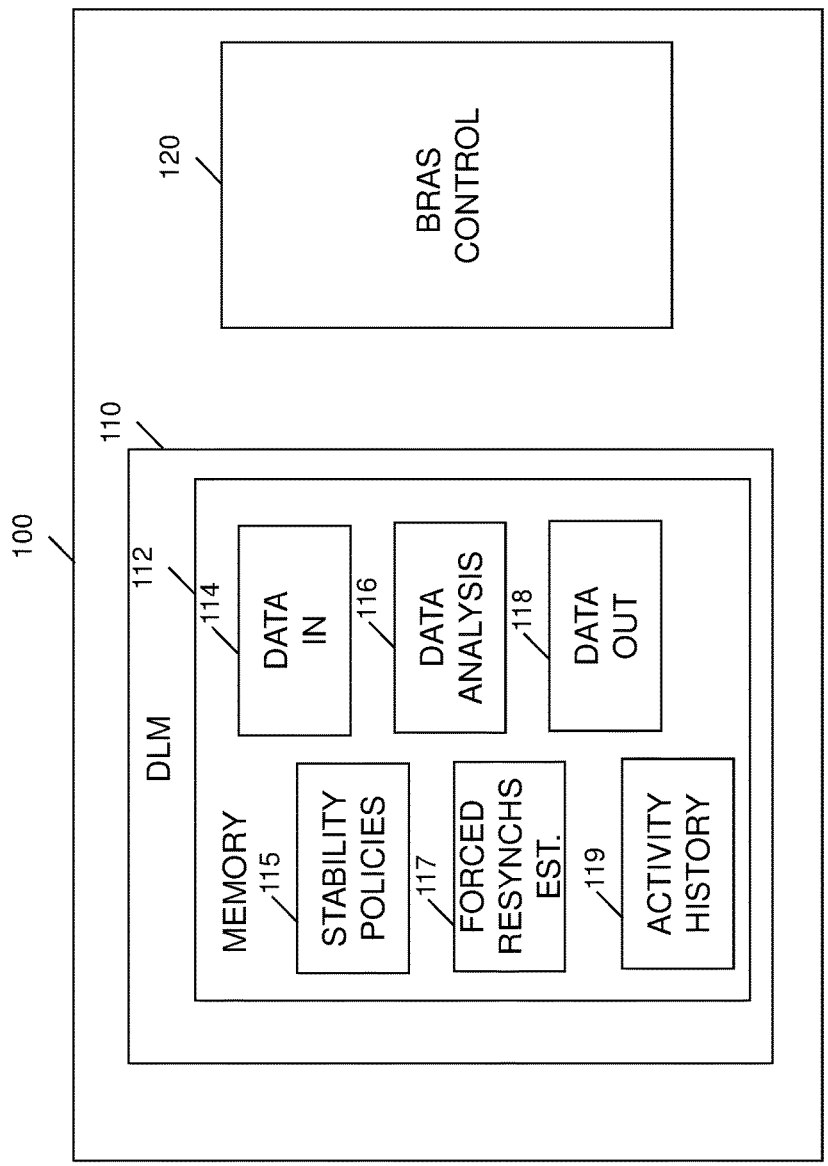
FIG. 2 is a schematic block diagram illustrating the management device of FIG. 1 in more detail.

As shown in FIG. 2, with this embodiment, management device 100 comprises two main functional parts, a BRAS provisioning or BRAS control function 120 and a DLM function 110.

Details of the particular algorithm employed in the present embodiment by the DLM function are set out below. In overview however, a DLM data-receiving sub-function receives a new file daily from each of a number of element managers, the daily file containing (in this case) up to 96 timeslots (i.e. 15-minute periods) per DSL connection per day together with information about a stability policy or level associated with each connection.

As will be explained later, before any decision regarding the possible generation or selection of a new profile for a particular connection is taken, information from the received file is essentially filtered in order to extract and use information that enables such a decision to be taken in a way that may be better aligned with what an end-user of the connection may benefit from or appreciate. In the main embodiment described here, the filtering is performed by the DLM function after it has received the complete (i.e. unfiltered) file, but it will be appreciated that the filtering may equally well be performed by another entity such as the DSLAM 20, in which case the management device 100 may receive the already-filtered file, in respect of which the DLM function may act.

Briefly, however, and irrespective of which entity performs the "filtering", two types of data are obtained in respect of each of a number of "shorter periods" (such as the ninety-six 15-minute "bins") within each of a number of longer "monitoring periods" (such as 24-hour periods). The data obtained in respect of each "bin" includes the following:

(i) indications of instability (or some other characteristic indicative of performance) on the line in question within the 15-minute period in question; and
(ii) indications of user activity on the line in question within the 15-minute period in question.

The bins can then be thought of as "active" if it is determined that there typically has been user activity within the 15-minute period in question, or "inactive" (or "dormant") otherwise. Subject to any "over-ruling" (as will be explained later), the decision as to whether it is appropriate to apply a new profile to the data connection in question can be taken on the basis of indications of instability (or other poor performance) obtained in respect of "active" bins, thereby allowing whatever instability may have occurred during "inactive" bins to be generally ignored or "discounted", as the end-user is unlikely to have been affected by this.

Manners in which the above may be achieved will be discussed in more detail later.

The data, having been "filtered", is used in a DLM analysis sub-function to determine if changes to the DSLAM profile are required to stabilise the end-user's service to comply with the connection's respective associated stability policy or level. If changes are required, a DLM output sub-function sends a request to the Operational Support System (OSS) of the access network for the profile applied to the line to be changed. The precise way in which this is performed will depend on the details of the OSS of the particular access network and is not relevant to an understanding of the invention, so will not be described further herein.

Each of the DLM sub-functions mentioned above may be implemented by standard computer processor components operating in accordance with software code modules stored in a memory 112 forming part of the DLM function 110; in particular, a DLM data receiving code module 114 (DATA IN) causes implementation of the DLM data receiving sub-function, a DLM analysis code module 116 (DATA ANALYSIS) causes implementation of the DLM analysis sub-function and a DLM output code module 118 (DATA OUT) causes implementation of the DLM output sub-function. Additionally, the memory 112 also stores the stability policy data set 115 (STABILITY POLICIES) in which the stability level or policy associated with each DSL connection managed by the management device is held and the activity history data set 119 (ACTIVITY HISTORY) in which an array of values of the activity history is stored. Furthermore, the memory 112 may also store a forced resynchronisation estimation module 117 (FORCED RESYNCHS EST.) for implementing a sub-function to estimate the number of resynchronisations for each line in each batch of data caused as a result of some sort of error, etc. occurring in the connection rather than as a result of user actions (e.g. to switch off or disconnect their DSL modem). This forced resynchronisation estimation sub-function is described in greater detail below.

The main source of input data for the DLM function is a series of daily files from each element manager, each daily file giving an aggregated report of each line's activity over the preceding 24-hour monitoring period. As mentioned above, the DLM function is arranged either not to receive, or to receive but then, subject to any over-ruling (as will be explained later), discount information relating to any 15-minute timeslots in respect of which it has been determined that the user was not actively using the line for sending or receiving data—this will be discussed in more detail below. This generally results in a change in DSLAM profile being applied no more frequently than once every 24 hours which is advantageous because it avoids the possibility of the DSLAM being reconfigured every time a line re-synchs. In addition however, the DLM function additionally receives input data specifying a stability level for each line. In the present embodiment, this is input from a database into which the data is manually entered by an operator as part of the process of provisioning a new DSL connection and is stored within the stability policies data set 115 within the DLM memory 112. Thus in the present embodiment, the intention is that when a customer orders a DSL connection he/she is offered different levels of stability (which will be most suitable for certain different types of activity); thus customers who mostly intend to use the connection for video streaming will benefit from a stable connection, whereas customers mostly using their connection for downloading large files, etc. would benefit from a higher bit-rate rather than from very high stability levels. Alternatively, instead of providing this facility on an end-user by end-user basis, retail customers (i.e. Service Providers) of the network service operator (i.e. a wholesale network operator) could be provided with the option to select a stability level on behalf of their customers and could sell this on to their (end-user) customers as a "specialised" product offering.

However, in alternative embodiments, the stability level could be updated more dynamically, as a result of a request by the user. In an example embodiment, a web server could be provided to receive user requests for a change of stability level (perhaps with a maximum permitted frequency of requests permitted per user, e.g. no more than one per hour or one per day, etc.) and this could then cause the DLM function as soon as possible to re-run it's comparison process for that line with the newly requested stability level and, if as a result of the comparison it is determined appropriate to transition to a new profile, then to transition to the new profile, again as soon as possible so that the user experiences a fairly dynamic response to a request to change the stability level.

Each time a line is checked to see if its profile should be changed (which in the present embodiment occurs once every 24 hours as part of a batch processing function), the corresponding stability level associated with that line is read and then threshold values for that line are set depending on the stability level associated with the respective line. The daily file data is then processed and the data for the respective line being analysed is compared with the threshold values set for that line in dependence upon the stability level associated with the line. If the comparison indicates that a transition should be made, a corresponding instruction is issued to the OSS system for a corresponding transition to be made.

The DSLAM profile in the present embodiment has two parameters which are adjusted in the various different profiles available for the DLM function to choose between in order to improve the stability of the line or conversely to improve the bit-rate or low-latency of the connection: the target margin and the run mode (the latter enabling the use of interleaving). The default line profile which is initially applied to all lines has a target margin of 6 db and interleaving disabled (often referred to as being in FAST mode). Changing these parameters is based on two performance metrics in the present embodiment, errors (in particular, in this embodiment, errors caused by code-violations) and re-trains (i.e. re-synchs).

The number of errors and re-trains is normalised to up-time (i.e. total synchronised time during the 24-hour period and during which the user is deemed to have been active with regard to their networked devices and network connection) to form the actual performance metrics used to determine the stability of the line. For example 10 errors in 1 hour of up-time after normalisation is (quite sensibly) very different from 10 errors in 1 minute of up-time, or (in user-perception terms) from 10 errors in 1 hour during which the user was not actually making active use of the connection. The normalisation is performed by calculating a mean-time-between either errors or re-synchs. Furthermore, the re-trains parameter may also be processed, prior to use as a stability performance metric, by discounting the number of re-synchs deemed to be user-caused re-synchs, prior to calculating the mean-time-between re-synchs, as these can be deemed not to have been caused directly by line instability.

Having calculated the metrics to be used in assessing the stability of the line, a check may be made against thresholds, etc. and a change in profile may be made if it is deemed necessary or desirable. A possible technique for this will be briefly described—more detail on that can be found in International patent application WO2012/042231, for example.

In general, if a move to a less aggressive profile is deemed necessary, a move over to an interleaved profile is made in preference to an increase in the target margin. Initially an interleaved profile is set with the same corresponding target margin as the previous fast mode profile (i.e. 6 dB fast would transition to 6 dB interleaved).

Before a transition is made, a check may be made against line rate to ensure that a line is capable of making the transition to a new profile without suffering a bit-rate drop so drastic that it would fall below a predetermined minimum acceptable bit-rate.

If a line fails to synchronise then a transition may be made to a lower target margin. If this means returning to a previously unstable state then this may be flagged for further investigation as the line is not effectively stabilised (even though it isn't at the maximum target margin). The line may be returned to the previous unstable state so that some level of service can be provided to the customer whilst an investigation takes place.

If a line fails to synchronise even at the lowest target margin, it may be flagged for investigation as this may indicate that it is unable to support the required service or is faulty.

Similarly, if a line is still unstable at the maximum possible target margin then it may be flagged for further investigation as this may also indicate that the line is faulty.

If a line is completely stable then in general the DLM function moves the line to a lower target margin (or interleave depth) to increase the available capacity (or reduce latency) on the line.

There may be a manual process to enable the transition between any line profile (e.g. 3 dB fast straight to 15 dB interleaved is possible by manual intervention).

Lines which have been flagged for investigation may be pro-actively repaired in the hope that they can be repaired before any fault report is generated.

Each line may be categorised by the first sub-function of the DLM function into one of a number of different categories in dependence upon the results of the analysis of the connection data. The categories may correspond to "very poor", "poor", "acceptable" and "very stable", for example (or as "poor", "OK" and "good", or in other ways).

The basic flow of the DLM process may be as is shown in Table 1 included as FIG. 5. In the present embodiment, the general progression through the profiles shown in Table 1 is as follows: if a line is to be changed to a more stable profile, the first change is to move to the profile with the same target margin but in interleaved mode instead of fast mode, if the line is already in an interleaved mode, then the line is moved to the next higher target margin profile also in interleaved mode. If the line is to be moved in the direction of increased capacity, it is kept in the same mode (i.e. fast or interleaved) but moved to the next lower target profile, unless it is at the minimum target margin in interleaved mode, in which case it is moved to the minimum target margin profile in fast mode.

In the second sub-function of the DLM function, a line categorised as very poor is immediately moved two steps in the better stability direction (e.g. from 6 dB Fast profile it would move to 9 dB Interleaved, from 6 dB Interleaved it would move to 12 dB Interleaved, etc.). A line categorised as poor is immediately (although with lower priority than the re-profiling of any very poor categorised lines) moved one step in the better stability direction (e.g. from 6 dB Fast to 6 dB Interleaved or from 9 dB interleaved to 12 dB Interleaved). A line categorised as acceptable is maintained on its current profile (i.e. no action is taken). A line categorised as very stable is moved (if the further requirements to avoid oscillations etc. are also satisfied) one step in the higher capacity direction (e.g. from 6 dB Fast to 3 dB Fast, from 9 dB Interleaved to 6 dB Interleaved or from 3 dB Interleaved to 3 dB Fast).

In the present embodiment, each line is processed once every 24 hours to determine how the line should be categorised, and thus if a new profile should be selected for that line. In order to avoid frequent oscillations between adjacent profiles, a good and a bad delay counter are used to place a delay on how quickly a line is re-profiled. Thus, every time a line is categorised as good, a good delay counter is incremented (and a poor delay counter is decremented) and only once the good delay counter has reached a good threshold (which in the present embodiment is set to 13) is a request made to the OSS for the profile to be increased by one step to a more aggressive level, and then the delay counters are reset. Furthermore, every time a line is categorised as poor, a poor delay counter is incremented (and the good delay counter is decremented) and only once the poor delay counter reaches a poor threshold (which in the present embodiment is set to 3) is its profile dropped by one step to a less aggressive level. The delay counters are never decremented below 0 such that even if a line has experienced a number of good days (such that the poor delay counter has been decremented to zero, e.g. five good days in a row) only 3 days in a row of the line behaving poorly are required for the poor threshold to be reached causing a re-profiling. Furthermore, a delay doubler is used to increase the delay (i.e. by increasing the good threshold) required before a line which has moved down from a more aggressive profile to a less aggressive profile level is allowed to re-transition back up to the more aggressive level. The delay doubler is therefore incremented (in the present embodiment up to a maximum of 5) whenever the line is re-profiled to a less aggressive level and then the delays are reset (as in the case where the line is re-profiled to a more aggressive level). Resetting the delays is done according to the following formulas:

GOOD THRESHOLD=DEFAULT GOOD THRESHOLD*2EXP(DELAY DOUBLER)

POOR DELAY COUNTER=GOOD DELAY COUNTER=0

The DEFAULT GOOD THRESHOLD is set in the present embodiment to 13 (i.e. equivalent to 14 days), the DEFAULT POOR DELAY is set in the present embodiment to 3 (i.e. equivalent to 3 days) and the DELAY DOUBLER is set to 0, thus the initial good delay is 13 but each time the line's profile is transitioned to a less aggressive profile the DELAY DOUBLER is incremented until after 5 such transitions, each time the DELAY is reset it is reset to a value of 448 (i.e. equivalent to about 14 months). In the present embodiment, if a user's stability policy or level is changed the delay doubler is reset back to zero; furthermore, the delay doubler and even the delay counter may be manually reset by an operator to cater for exceptional circumstances.

In the present embodiment, the specific functionality of the DLM function to permit different lines to operate at different levels of stability according to stability policies set for each line is described below with reference to FIG. 3. In brief, before the DLM performs its line categorisation function for a particular line, its associated stability level may be determined and then the categorisation may be based on the threshold values associated with the respective stability level, each stability level having a different set of associated threshold values for use in the categorisation function. Thus, at step s5 the stability level for the particular line to be categorised is obtained together with the delay data stored for that line (i.e. the current value for the delay counter, DELAY, which, as mentioned above, is initially set to a value of 3 and the current value of the delay doubler, DELAY DOUBLER, which is initially set to a value of 0).

The process then moves to step s10 in which the threshold values associated with the stability level looked up in step s5 are obtained for use in the remainder of the process and then the process proceeds to step s15.

At step s15 the DLM function obtains the current error and re-synch data which it has received in respect of the present line being analysed. This is read from the daily data file which is sent to the DLM function on a daily basis as described above. The process then proceeds to step s18.

At step s18, a filtering step is performed in respect of the ninety-six 15-minute "bins" received in respect of the previous 24-hour monitoring period (in the present embodiment) for the particular DSL connection in question. The "filtering" may be performed in a variety of ways, and will be discussed in more detail later.

The process then proceeds to step s20. Step s20 is the step responsible for actually categorising lines into one of (in this instance) four possible categories (i.e. "very poor", "poor", "OK" and "good", or whichever names are applicable). To do this both of the metrics used in the present embodiment, namely number of errors detected (at both the user modem and the network modem in the DSLAM) and the number of re-synchs (as recorded by the DSLAM) are compared (after normalisation as mentioned above) with various corresponding thresholds whose values are set according to the stability level to which the line is assigned.

Filtering by Discounting Subject to Over-Ruling

As indicated earlier, for each 15-minute bin (or other shorter period) within each 24-hour (or other) monitoring period, data of (at least) two particular types is received for each line:

data indicative of instability (and/or other performance characteristics); and data indicative of user activity.

The indications of instability may be indications that one or more re-synchronisations occurred during the 15-minute period in question—these may be taken as indications that the connection experienced sufficient instability during that period that the connection temporarily failed, and needed to be re-established.

As well as or instead of indications relating to whether any re-synchronisations occurred during the 15-minute period in question, indications that one or more data errors occurred during the 15-minute period in question may be taken as indications that the connection experienced instability during that period.

As discussed earlier, it will be noted that other types of indications, such as line-rate indications, latency indications or signal-to-noise ratio indications may be used as indications of performance as well as or instead of instability indications.

The indications of user activity may be taken from upstream and/or downstream traffic counts, indicating the amount of data (in kilobytes, for example) that has traversed the connection during the 15-minute period in question. If upstream and downstream user traffic counts are both used, they may simply be added to obtain an indication of the total user traffic on the connection during the 15-minute period in question. Most modern hubs/routers connected to DSL lines have higher-layer management functions which pass "keep-alive" and other management traffic over the DSL line even when a user isn't actively using the line. A traffic count equal to or above a threshold (e.g. 2 Mb) is taken as an indication that the user has been making active use of the connection during the 15-minute period in question, whereas a count below the threshold is taken as an indication to the contrary.

For each bin, a historic activity value is stored in memory, which may be used to cause an "inactivity" indication in respect of a particular bin in the most recent data to be over-ruled.

The following exemplary functions (or others) may be used to update the historic activity value for each bin based on the new traffic data:

ActiveToday=If traffic count is greater than threshold set to 1 otherwise set to 0.

Historic activity value=previous historic activity value*(1−1/$A$)+ActiveToday

If historic activity value<B then set to historic activity value=zero.

$A$ and $B$ can be chosen to set the "memory" of the system to different numbers of days. This function means that repeated days of activity in a bin result in a longer memory than only a single day of activity.

Assuming one-day monitoring periods split into 15-minute bins are used (although other durations could equally be used, e.g. 1-hour bins):
 (i) there would be 96 historic bin values per line to account for time of day variation with one pair of $A$ and $B$ values
 (ii) there would be two sets of 96 historic bin values per line if weekends and weekdays were treated separately, and (possibly) two sets of $A$ and $B$ values.
 (iii) there would be one set of 672 historic bin values per line if all days of the week were treated separately, and one pair of $A$ and $B$ values.
 (iv) Other splits could be configured by the user.

Using the third option, and setting $A=3.4$ and $B=0.25$ would result in a minimum 4-week memory of activity.

As an extension, depending on the variability of user behaviour on 'unusual' days such as public holidays or festivals (Christmas, etc.) when compared to normal days, one or more of the following options may be implemented:

'Unusual' days may be treated as weekend days
'Unusual' days may ignored, so as not to affect the analysis of other periods
'Unusual' days may be treated as completely inactive Unusual days can either be defined by the operator and/or detected before the main algorithm is run. Detection could be based on the statistics of the activity day across all lines for a given day. An unusual day could be defined as a day where the median, 10% and 90% of number of active bins per user across all users deviate from the typical for a weekday or weekend or by another method.

Essentially, this filtering step may involve inspecting the historic activity value in respect of each "bin", and identifying bins in respect of which the historic activity value is indicative of user activity having been observed recently on the data connection during the 15-minute period in question. For any such bins, the associated instability indications are obtained for subsequent use in categorising the line in step s20. For any bins in respect of which the historic activity value data is indicative of no recent user activity (value is zero) having been observed on the data connection during the 15-minute period in question, the associated instability indications are discounted when subsequently categorising the line in step s20.

Figure 3:
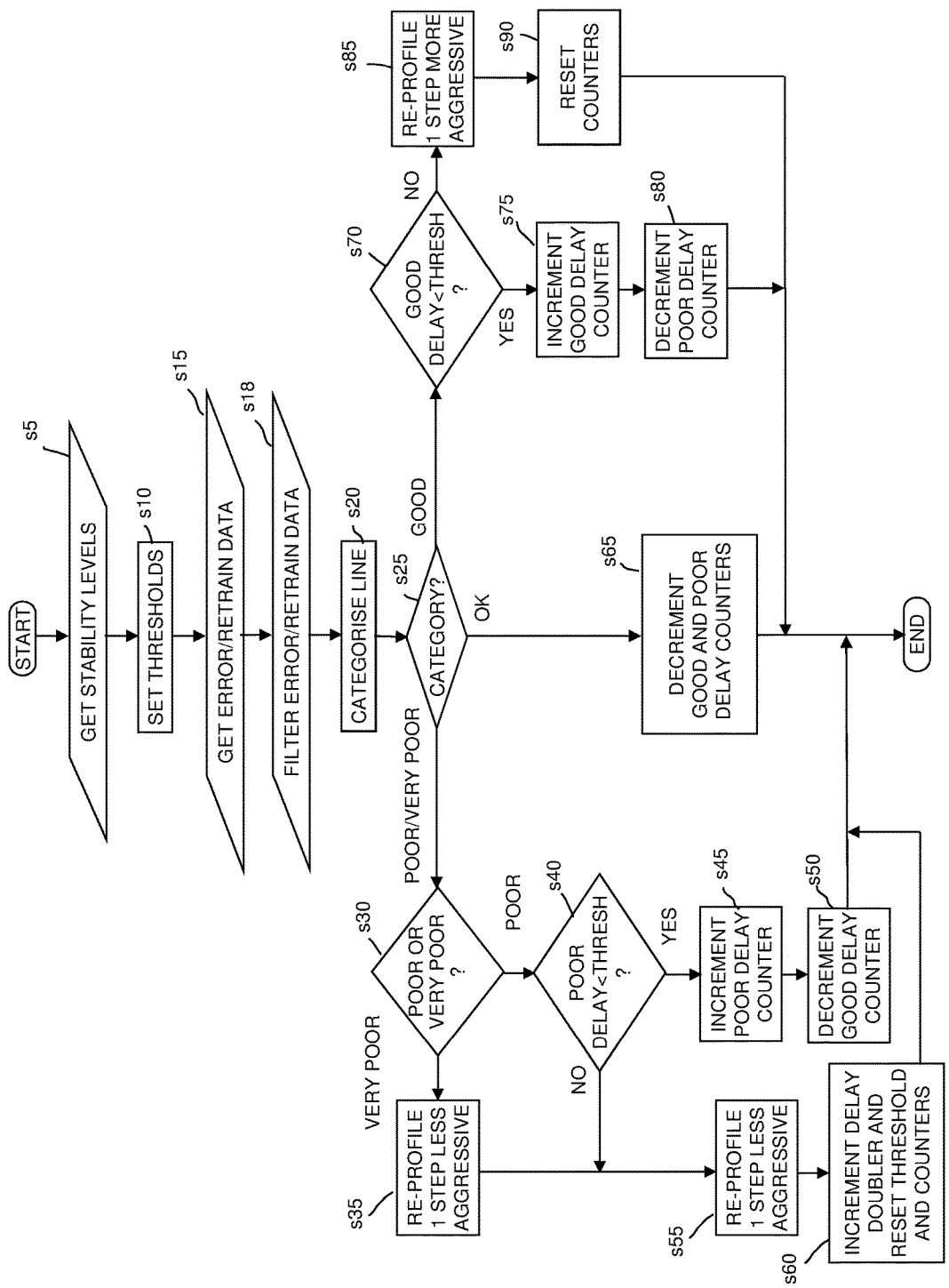
FIG. 3 is a flow diagram illustrating the steps carried out by the management device of FIG. 1 in order to control the DLM profile applied to the DSL connections in the network of FIG. 1.
Figure 4:
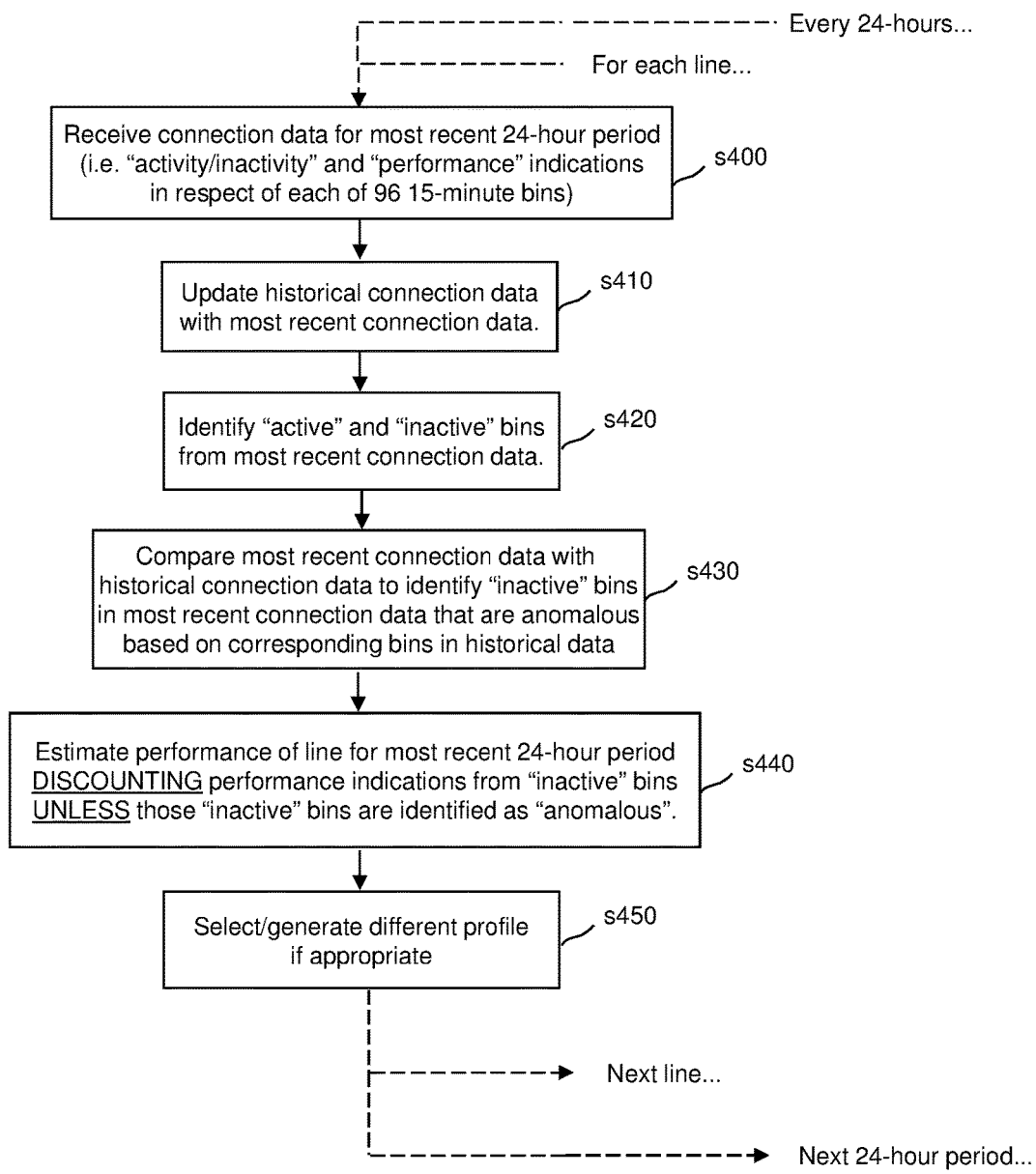
FIG. 4 illustrates, in simplified form, steps that may be carried out by the management device of FIG. 1 in order to take account of historical connection data relating to one or more previous monitoring periods when performing processing of recently-received connection data relating to a most recent monitoring period.

Referring now to FIG. 4, this illustrates, in simplified form, steps that may be performed in order to take account of historical connection data relating to other monitoring periods when performing processing of recently-received connection data relating to a most recent monitoring period. Such processing may be performed each day (or other such monitoring period), for example, and may be performed based on newly-received connection data in respect of each of a number of lines. It may correspond broadly to steps s15 (obtaining connection data), s18 (filtering connection data) and the overall profile change process (s20-s90) of FIG. 3, but for simplicity, relates mainly to the filtering of data relating to a most recent monitoring period using data relating to one or more other monitoring periods.

In step s400, connection data for a particular line for the most recent 24-hour period is received. This may be in the form of "activity/inactivity" indications and "performance" indications in respect of each 15-minute bin making up the most recent 24-hour period.

In step s410, this connection data may be stored, such that it can be included in or reflected in the "historical" or "other" connection data once connection data in respect of a further 24-hour period is received (i.e. the next day).

In step s420, the most recent connection data is analysed in order to identify which bins were "active" and which bins were "inactive" during the most recent 24-hour period. Without further analysis, this would allow indications of poor performance during the most recent 24-hour period to be discounted if they relate to 15-minute periods in which the line was not actually being used, and this itself may be taken into account when deciding whether or not to apply a different profile to the line, and if so, what profile to apply.

In step s430, however, the most recent connection data is compared with the historical connection data for the line in question to identify (possibly only for bins in respect of which the performance was poor) any "inactive" bins in the most recent connection data that are in fact anomalous based on corresponding bins in the historical connection data for the line in question. For example, it may be found that while the line wasn't being used in the period from 09:15 until 09:30 of the most recent day, the historical data indicates that such inactivity was an anomaly, since the line has generally been in use at that time of the day during the majority of days in the past week, month, or year.

In step s440, the performance of the line for the most recent 24-hour period is estimated taking account of the above information relating to "active" and "active" bins, discounting performance indications from any "inactive" bins of the most recent 24-hour period unless those "inactive" bins have been identified as "anomalous" based on corresponding bins from connection data in respect of previous days.

In step s450, a different profile is selected or generated if appropriate, based on the modified estimate of the performance of the line.

It will be apparent that in scenarios where a plurality of different types of instability indications, or more generally, a plurality of different types of performance indications are used, embodiments may apply the technique of discounting, but potentially over-riding the discounting of some performance indications in respect of one or more of those types of performance indications. For example, in a scenario where a system receives information about errors as well as information about re-trains, and also receives information about the line-rate during each 15-minute bin or other period, it may be decided that errors are of importance to user experience only during "active" bins or periods, but that retrains at any time of day are indicative of a need for a profile change so should be taken account of even if they occur during "inactive" bins or periods, whereas line-rate issues should only affect possible changes of profile if they occur at times of the day when the user is generally active. In order to achieve this, the system may take account of each type of indication in a different manner when deciding whether or not to apply a different profile, i.e.

- taking account of all "retrain" indications, not discounting them even if they relate to "inactive" 15-minute periods;
- taking account of any received "error" indications that relate to "active" 15-minute periods (so discounting any that relate to "inactive" 15-minute periods); and
- taking account of "slow line-rate" indications in respect of "active" and "inactive" 15-minute periods if they relate to 15-minute periods at times of the day when the user is generally active (so discounting them if they relate to "inactive" 15-minute periods unless the available historical data relating to previous days demonstrates that the "inactivity" within those 15-minute periods in the day currently being analysed is itself anomalous).

Another option, possibly for users found to have a very variable usage pattern, may be for the discounting of instability indications to be over-ruled in respect of one or more periods adjacent to historically active periods.

Another option is as follows. Depending on the activity indicator (i.e. video in-use indicator) other services may be in use during periods classified as inactive. In this scenario it may be appropriate to replace discounting of instability indications with reduction in weighting of instability indications during inactive periods. In this case, instead of discounting instability indications during a bin considered inactive, the instability indications may be multiplied by a value (for example 0.25), thereby reducing the impact of instability during inactive periods by a factor of 4. If the value is set to 0, the behaviour will correspond to that of the main embodiment. Different multipliers could be used for multiple different instability indications.

In another possible option, if multilevel activity indicators are available indicating the importance of service in use (i.e. traffic counters to indicate use and multicast data to indicate an important service in use) during each sub-period, then during periods of high priority service the instability indicators may be increased in weight. For example if traffic counters indicate activity and multicast activity logs indicate important service in use, 15-minute periods may be treated as inactive, active or high-priority. In this case, two historic activity profiles may be maintained, one indicating which periods showed activity and a second showing high priority activity. For each 15 minutes in a day the historic data shows as inactive, active or high priority (high priority overrides activity), given the activity state the instability indications are multiplied by one of three values, INACTIVEWEIGHT, ACTIVEWEIGHT, HIGHWEIGHT respectively. These values could be set to 0.25, 1 and 1.5. This concept could be extended to multiple levels of priority, with different multipliers being used for multiple different instability indications.

Returning now to the process shown in FIG. 3, it will be understood that following any filtering of the instability indications or other performance data in step s18, it will then be possible to categorise the line (in step s20) in such a way that the effect of different types of performance indications may only influence the choice of category (and hence a possible change of profile) if deemed appropriate with respect to whether the line was in active use at the time, and/or whether historical performance data indicates the line is normally in active use at the time of the day in question. As indicated earlier, in step s20 of the main embodiment, the line is categorised into one of its possible categories (e.g. "very poor", "poor", "OK" and "good"), the metrics concerned being compared with various corresponding thresholds whose values are set according to the stability level to which the line is assigned.

Table 2 (see FIG. 6) sets out the various thresholds used in the present embodiment. In Table 2, "mtb" stands for "mean time between" and thus corresponds to the normalised metrics calculated by dividing the total time in seconds for which the respective line has been in synchronisation and in active use over the past 24-hour period of the monitoring by the number of re-trains or errors recorded in that period. For all cases, in the present example, if there are more than 10 re-trains in any one hour period, the line is assumed to be very poor, regardless of the number of errors recorded. For lines operating at an aggressive stability level, if the average time between retrains is less than once per hour (=3600 seconds) (e.g. 6 re-trains in less than 5 hours of "active up-time") or if the average time between errors is less than one per 10 seconds of active up-time, then the line is deemed to be poor; if the average time between re-trains is less than once every 2.4 hours (but more than once every hour) of active up-time or the average time between errors is less than once every 2.4 hours (but more than once every 10 seconds) of active up-time then the line is deemed to be "OK", whereas if the average time between re-trains is greater than or equal to once every 2.4 hours or if the average time between errors is greater than or equal to once every 2.4 hours, then the line is deemed to be good. From Table 2, it is clear what the thresholds are for the other stability levels in the same way.

In an alternative embodiment, the stability levels could operate such that for the most aggressive stability level the DLM function attempts to keep sync losses to below 12 per 24-hour period (including switching off modems/routers which count as a sync loss) and to keep the line error-free for 98.3% (59/60 seconds) of active uptime measured over a 24-hour period; for the normal stability level the DLM function attempts to keep sync losses to below 6 per 24-hour period and to keep the line error-free for 99.8% (599/600 seconds) of active uptime measured over a 24-hour period; and for the stable stability level the DLM function attempts to keep sync losses to below 3 per 24-hour period and to keep the line error-free more than 99.98% (5999/6000 seconds) of active uptime measured over a 24-hour period.

Having categorised the line according to Table 2 in step s20 the process proceeds to step s25 where it is determined if the line has been categorised as being "poor", "very poor", "OK" or "good". If the line is categorised as being "poor" or "very poor", the process proceeds to step s30 in which it is determined if the line has been categorised as very poor or poor. If at step s30 it is determined that the line has been categorised as very poor then the process proceeds to step s35 in which an OSS request is issued for the line profile to be transitioned two steps in the less aggressive direction, provided it is at least two steps above the minimally aggressive level (which, in the present embodiment is 15 dB, Interleaved as is clear form Table 1), otherwise it transitions straight to this minimally aggressive level; if the line is already at this minimally aggressive level, it remains there but a fault is flagged to the system for attention by an engineer. Upon completion of step s35, the method proceeds to step s60.

If at step s30 it is determined that the line has been categorised as poor, the process proceeds to step s40 in which it is determined if the poor delay counter is less than the poor threshold. If so, the method proceeds to step s45 in which the poor delay counter is incremented (by one) then the method proceeds to step s50 in which the good delay counter is decremented (by one). Upon completion of step s50, the process ends (for the respective exceeds) the poor threshold, then the method proceeds to step s55 in which an OSS request is issued for the line DLM profile to be transitioned one step in the less aggressive direction, provided it is not already at the minimally aggressive level (which, in the present embodiment is 15 dB, Interleaved, as is clear form Table 1), otherwise it remains there (i.e. at the minimally aggressive level) but a fault is flagged to the system for attention by an engineer. On completing step s55, the method proceeds to step s60.

At step s60, which is arrived at either after performing a two-step less aggressive re-profiling in step s35 or after performing a one-step re-profiling in step s55, the delay doubler is incremented by one (provided it has not already reached its maximum value of 5 in which case it just stays at 5) and then the good threshold is reset according to the formula GOOD THRESHOLD=DEFAULT GOOD THRESHOLD*2EXP(DELAY DOUBLER). Finally in step s60, the poor and good delay counters are both reset to zero. Upon completion of step s60, the method ends (for the respective line being processed) and the DLM function moves on to analysing any further lines requiring analysis in the current 24-hour period batch process.

If at step s25 it is determined that the line is categorised as OK, the process proceeds to step s65 in which the good and bad delay counters are both decremented by one (although if a counter is already at zero, it is not decremented further but stays at zero). This decrementing of the delay counters for lines which are categorised as OK ensures that lines which are only occasionally good or only occasionally bad but mostly are OK will remain on their current profile setting. Upon completion of step s65, the process (for the respective line) ends.

If at step s25 it is determined that the line is "good", the method proceeds to step s70 in which it is determined if the good delay counter is less than the good threshold. If so, the process proceeds to step s75 in which the good delay counter for the line in question (GOOD DELAY) is incremented (by one). Upon completion of step s75, the process proceeds to step s80 in which the poor delay counter (POOR DELAY) is decremented; this helps to prevent lines which are typically good as often as they are poor from being moved to a different profile. Upon completion of step s80, the process (for the respective line) ends.

If at step s70 it is determined that the good delay counter (GOOD DELAY) is not less than the good threshold (GOOD THRESHOLD)—i.e. it has reached or exceeded the threshold—then the process proceeds to step s85 in which an OSS request is made to transition the DLM profile of the line one step in the more aggressive direction (provided it is not already at the most aggressive profile, which, in the present embodiment is 3 dB non-interleaved mode, as is clear from Table 1, in which case it simply stays at this most aggressive profile). Upon completion of step s85, the method proceeds to step s90 in which the delay counters, GOOD DELAY and POOR DELAY, for the line are reset and the process (for the respective line) ends. As mentioned above, once the process ends for the line currently being processed, the DLM function moves on to analysing any further lines requiring analysis in the current 24-hour period batch process.

In certain situations, "power mode" indications may be used as indications of user activity or inactivity. This may be applicable, for example, in relation to DSL connections operable to operate in different power modes including a low-power mode which is entered when little or no user data is being sent over the connection (in either direction). Such a low-power mode is included in the ITU-T G.992.3 standard which introduces an L2 mode; basically, the DSL line monitors (e.g. one or both of the DSL transceivers—usually the Central Office end DSL transceiver) the data throughput on the line and when there is no or very little data being transferred on the line, then it can request (to the other transceiver—e.g. the remote or user end transceiver) a transition into the L2 low-power mode. This reduces the power and bit-rate of the line; the moment more bandwidth is required than can be supported by the L2 low-power mode rate, the line shifts back to the previous (high-power) L0 rate. Thus tracking for operation in the L2 low-power mode should track pretty much when the line is/isn't in use. Additional parameters in the DLM performance metric field may thus be collected in respect of each bin, including a power mode status indicator specifying which power mode the line is in for each 15-minute bin.

This option applies not only to ADSL2 and ADSL2+ transceivers operating with L2 mode capability as set out in G.992.3 and related standards, but also to other forms of DSL (e.g. VDSL) if they include such a low-power capability for low user data rate situations.

The invention claimed is:

1. A method of operating an access network including a plurality of data connections between end-user devices and an aggregation transceiver device at which the data connections are aggregated for onward connection through the access network, the method comprising, for each data connection:

obtaining connection data in respect of each of a plurality of monitoring periods, each monitoring period comprising a plurality of shorter periods, the connection data in respect of a particular monitoring period comprising, for each of the shorter periods of said particular monitoring period, a performance indication indicative of whether or not the performance of the data connection has been above or below a predetermined performance threshold during said shorter period, and a user activity indication indicative of a measure of user activity on said data connection during said shorter period;

monitoring the performance of the data connection in dependence on said connection data, the monitoring including identifying, from the shorter periods within a particular monitoring period, those shorter periods in respect of which the user activity indication is indicative of user activity above a predetermined level having been observed on said data connection during said shorter period, and estimating, from performance indications obtained in respect of those shorter periods so-identified, a measure of the performance of the data connection during said particular monitoring period; and applying a profile to the data connection, the profile specifying a set of values for one or more parameters associated with said data connection and being dependent on the measure of the performance of the data connection;

wherein estimating the measure of the performance of the data connection during said particular monitoring period comprises discounting performance indications obtained in respect of shorter periods within said particular monitoring period in respect of which the user activity indications are indicative of user activity above said predetermined level not having been observed unless one or more user activity indications obtained in respect of one or more corresponding shorter periods within one or more other monitoring periods indicate that user activity above said predetermined level has been observed during the corresponding shorter periods within the one or more other monitoring periods.

2. A method according to claim 1 wherein the performance indications for a data connection are stability indications indicative of whether or not the data connection has experienced instability during the respective shorter periods.

3. A method according to claim 1 wherein the performance indications for a data connection are indications indicative of whether or not the data connection has re-synchronised during the respective shorter periods and/or indicative of the number of times said data connection has re-synchronised during the respective shorter periods.

4. A method according to claim 1 wherein the performance indications for a data connection are indications indicative of whether or not errors have occurred in data traversing said data connection during the respective shorter periods and/or indicative of the number of errors that have occurred in data traversing said data connection during the respective shorter periods.

5. A method according to claim 1 wherein the connection data for a data connection comprises performance indications relating to a plurality of different characteristics.

6. A method according to claim 5 wherein the plurality of different characteristics comprises one or more selected from: stability, line-rate, latency, signal-to-noise ratio.

7. A method according to claim 5 wherein estimating the measure of the performance of a data connection during a particular monitoring period comprises discounting performance indications relating to one or more of said plurality of different characteristics obtained in respect of shorter periods within said particular monitoring period in respect of which the user activity indications are indicative of user activity above said predetermined level not having been observed unless one or more user activity indications in respect of one or more corresponding shorter periods within one or more other monitoring periods indicate that user activity above said predetermined level has been observed during the corresponding shorter periods within the one or more other monitoring periods.

8. A method according to claim 1 wherein the user activity indications in respect of a particular data connection comprise indications indicative of one or more of:
(i) a measure of the amount of user data flowing on said data connection from one or more end-user devices during the respective shorter periods;
(ii) a measure of the amount of user data flowing on said data connection towards one or more end-user devices during the respective shorter periods;
(iii) a measure of the combined amount of user data flowing on said data connection either to or from one or more end-user devices during the respective shorter periods;
(iv) a measure of the amount of a particular type of user data flowing on said data connection from one or more end-user devices during the respective shorter periods;
(v) a measure of the amount of a particular type of user data flowing on said data connection towards one or more end-user devices during the respective shorter periods;
(vi) a measure of the combined amount of a particular type of user data flowing on said data connection to and from one or more end-user devices during the respective shorter periods.

9. A method according to claim 1 wherein the user activity indications in respect of a particular data connection comprise power-mode indications indicative of whether or not the data connection in question was in a low-power mode or not during the respective shorter periods, user activity indications being taken as being indicative of user activity not having been observed above said predetermined level in the event that said power-mode indications indicate that the data connection in question was in a low-power mode during the respective shorter periods.

10. A method according to claim 1 wherein the length of a monitoring period is of the order of one hour, one day, one week, one month, or one year.

11. A method according to claim 1 wherein estimating the measure of the performance of the data connection during said particular monitoring period comprises an analysis of user activity during corresponding shorter periods within a plurality of other monitoring periods.

12. A method according to claim 1 wherein estimating the measure of the performance of the data connection during said particular monitoring period comprises an analysis of user activity during corresponding shorter periods within one or more other monitoring periods corresponding to said particular monitoring period, one or more other monitoring periods being deemed to be corresponding monitoring periods in dependence on one or more of the following:
(i) whether the particular monitoring period and the one or more other monitoring periods relate to the same day of the week;
(ii) whether the particular monitoring period and the one or more other monitoring periods relate to weekdays or weekend days;
(iii) whether the particular monitoring period and the one or more other monitoring periods relate to public holiday days;
(iv) a user-specific or provider-specific definition specifying which other monitoring period or periods correspond to the particular monitoring period for the data connection in question.

13. A method according to claim 1 wherein shorter periods within different monitoring periods are deemed to be corresponding shorter periods if they relate to periods of time at corresponding stages within different monitoring periods and/or periods of time next to periods of time at corresponding stages in different monitoring periods.

14. A management device for use in an access network comprising a plurality of data connections between end-user devices and an aggregation transceiver device at which the data connections are aggregated for onward connection through the access network, the device comprising:
    a data collection module operable to obtain, in respect of each of a plurality of data connections, connection data in respect of each of a plurality of monitoring periods, each monitoring period comprising a plurality of shorter periods, the connection data in respect of a particular monitoring period comprising, for each of the shorter periods of said particular monitoring period, a performance indication indicative of whether or not the performance of the data connection has been above or below a predetermined performance threshold during said shorter period, and a user activity indication indicative of a measure of user activity on said data connection during said shorter period;
    a data analysis module operable to monitor the performance of data connections in dependence on connection data obtained in respect thereof, the monitoring for a data connection including identifying, from the shorter periods within a particular monitoring period, those shorter periods in respect of which the user activity indication is indicative of user activity above a predetermined level having been observed on said data connection during said shorter period, and to estimate, from performance indications obtained in respect of those shorter periods so-identified, a measure of the performance of the data connection during said particular monitoring period; and
    a profile application module operable to apply profiles to the data connections, the profile for a data connection specifying a set of values for one or more parameters associated with said data connection and being dependent on the measure of the performance of said data connection;
    wherein estimating the measure of the performance of a data connection during a particular monitoring period comprises discounting performance indications obtained in respect of shorter periods within said particular monitoring period in respect of which the user activity indications are indicative of user activity above said predetermined level not having been observed unless one or more user activity indications obtained in respect of one or more corresponding shorter periods within one or more other monitoring periods indicate that user activity above said predetermined level has been observed during the corresponding shorter periods within the one or more other monitoring periods.

15. An access network including a management device according to claim 14.

16. A non-transitory storage medium carrying a computer program or suite of computer programs for causing a method of operating an access network including a plurality of data connections between end-user devices and an aggregation transceiver device at which the data connections are aggregated for onward connection through the access network to be carried out during execution of the program or programs, the method comprising, for each data connection;
    obtaining connection data in respect of each of a plurality of monitoring periods, each monitoring period comprising a plurality of shorter periods, the connection data in respect of a particular monitoring period comprising, for each of the shorter periods of said particular monitoring period, a performance indication indicative of whether or not the performance of the data connection has been above or below a predetermined performance threshold during said shorter period, and a user activity indication indicative of a measure of user activity on said data connection during said shorter period;
    monitoring the performance of the data connection in dependence on said connection data, the monitoring including identifying, from the shorter periods within a particular monitoring period, those shorter periods in respect of which the user activity indication is indicative of user activity above a predetermined level having been observed on said data connection during said shorter period, and estimating, from performance indications obtained in respect of those shorter periods so-identified, a measure of the performance of the data connection during said particular monitoring period; and
    applying a profile to the data connection, the profile specifying a set of values for one or more parameters associated with said data connection and being dependent on the measure of the performance of the data connection;
    wherein estimating the measure of the performance of the data connection during said particular monitoring period comprises discounting performance indications obtained in respect of shorter periods within said particular monitoring period in respect of which the user activity indications are indicative of user activity above said predetermined level not having been observed unless one or more user activity indications obtained in respect of one or more corresponding shorter periods within one or more other monitoring periods indicate that user activity above said predetermined level has been observed during the corresponding shorter periods within the one or more other monitoring periods.

* * * * *